US008957362B2

(12) United States Patent
Du et al.

(10) Patent No.: US 8,957,362 B2
(45) Date of Patent: Feb. 17, 2015

(54) DETERMINING RELATIVE TIMING OFFSET IN DIFFERENT ELECTRONIC PATHWAYS USING INTERNAL SIGNALS

(71) Applicants: Huini Du, Vernon Hills, IL (US); Gin Chung Wang, Grayslake, IL (US); Jerry Wang, Lake Zurich, IL (US)

(72) Inventors: Huini Du, Vernon Hills, IL (US); Gin Chung Wang, Grayslake, IL (US); Jerry Wang, Lake Zurich, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 185 days.

(21) Appl. No.: 13/656,329

(22) Filed: Oct. 19, 2012

(65) Prior Publication Data

US 2014/0110567 A1 Apr. 24, 2014

(51) Int. Cl.
*H01J 40/14* (2006.01)
(52) U.S. Cl.
USPC ............ 250/214 RC; 250/214 R; 250/214 C; 250/363.04; 250/363.09
(58) Field of Classification Search
USPC ................. 250/214 RC, 214 R, 214 P, 214 C, 250/363.02, 363.04, 363.05, 363.09; 327/544
See application file for complete search history.

(56) References Cited

U.S. PATENT DOCUMENTS

| | | | |
|---|---|---|---|
| 2006/0102845 A1 | 5/2006 | Williams et al. | |
| 2007/0270693 A1 | 11/2007 | Fiedler et al. | |
| 2011/0001053 A1 | 1/2011 | Solf | |
| 2012/0091348 A1 | 4/2012 | Wang et al. | |
| 2012/0153166 A1* | 6/2012 | Gueorguiev et al. | 250/362 |

FOREIGN PATENT DOCUMENTS

| | | |
|---|---|---|
| JP | 2007-147472 A | 6/2007 |
| JP | 2008-510129 A | 4/2008 |
| JP | 2009-281816 A | 12/2009 |
| JP | 2011-513761 A | 4/2011 |
| JP | 2012-88306 A | 5/2012 |

OTHER PUBLICATIONS

International Search Report and Written Opinion issued Jan. 7, 2014, in PCT/JP2013/078462 with English translation of category of cited documents.
Masayasu Noguchi, et al., "Low-Level Randon Measurements with a-$\beta$ Coincidence Methods", 44, 9, Apr. 30, 1975, pp. 979-983 (with English Abstract).
International Search Report issued Jan. 7, 2014 in PCT/JP2013/078462 (submitting English translation only).

* cited by examiner

*Primary Examiner* — Kevin Pyo
(74) *Attorney, Agent, or Firm* — Oblon, Spivak, McClelland, Maier & Neustadt, L.L.P.

(57) ABSTRACT

A process and system including a detector having a photosensor therein that outputs a signal and a plurality of after-pulse detector devices independently connected to the photosensor via respective pathways. The after-pulse detector devices each detecting an after-pulse in the signal, where the after-pulse represents an after-event in the photosensor triggered from a previous photon generating event. The system further includes a processing device that receives an indication of the detection of the after-pulse from each of the plurality of after-pulse detector devices and determines a relative delay between the respective pathways based on timing the received indications, and includes a memory that stores the relative delay in association with an identification of the corresponding after-pulse detector devices.

16 Claims, 7 Drawing Sheets

DETERMINING RELATIVE TIMING OFFSET IN DIFFERENT ELECTRONIC PATHWAYS USING INTERNAL SIGNALS

CROSS-REFERENCE TO RELATED APPLICATIONS

This application is related to the application entitled "Method and Apparatus for photosensor Gain and Scintillation Crystal Optical Coupling Monitoring in Radiation Detectors" (U.S. application Ser. No. 13/656,306), the contents of which are incorporated herein by reference.

FIELD

The embodiments described herein relate generally to a system and a method of improving timing accuracy for a PET imaging system.

BACKGROUND

In PET imaging, or positron emission tomography, a radiopharmaceutical agent is administered, via injection, inhalation and/or ingestion, to a patient. The physical and bio-molecular properties of the agent then concentrate at specific locations in the human body. The actual spatial distribution, intensity of the point and/or region of accumulation, as well as the kinetics of the process from administration and capture to eventual elimination, all have clinical significance. During this process, the positron emitter attached to the radiopharmaceutical agent emits positrons according to the physical properties of the isotope, such as half-life, branching ratio, etc. Each positron interacts with an electron of the object, is annihilated and produces two gamma rays at 511 keV (electron-positron annihilation event), which travel at substantially 180 degrees apart. The two gamma rays then cause a scintillation event at a scintillation crystal of the PET detector, which detects the gamma rays thereby. By detecting these two gamma rays, and drawing a line between their locations or "line-of-response," the likely location of the original annihilation is determined. While this process only identifies one line of possible interaction, accumulating a large number of these lines, and through a tomographic reconstruction process, the original distribution is estimated with useful accuracy. In addition to the location of the two scintillation events, if accurate timing—within a few hundred picoseconds—is available, time-of-flight calculations are also made in order to add more information regarding the likely position of the annihilation event along the line. Limitations in the timing resolution of a scanner determine the accuracy of the positioning along this line. Limitations in the determination of the location of the original scintillation events determine the ultimate spatial resolution of the scanner. A specific characteristic of the isotope (for example, energy of the positron) contributes (via positron range and co-linearity of the two gamma rays) to the determination of the spatial resolution for a specific radiopharmaceutical agent.

As timing accuracy is an important factor, timing differences due to electronic pathway disparities need to be considered and addressed. The conventional way of measuring differences due to electronic pathway disparities includes using a signal generated from an external source such as a radioactive isotope. Thus, a radioactive source with phantom is typically used to measure the electronic pathway timing disparities. When processing the obtained data, an iterative method is used to perform measurements due to the indirect way in which the timing is measured. This iterative method is time consuming and costly.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present embodiments.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

Figure 1:
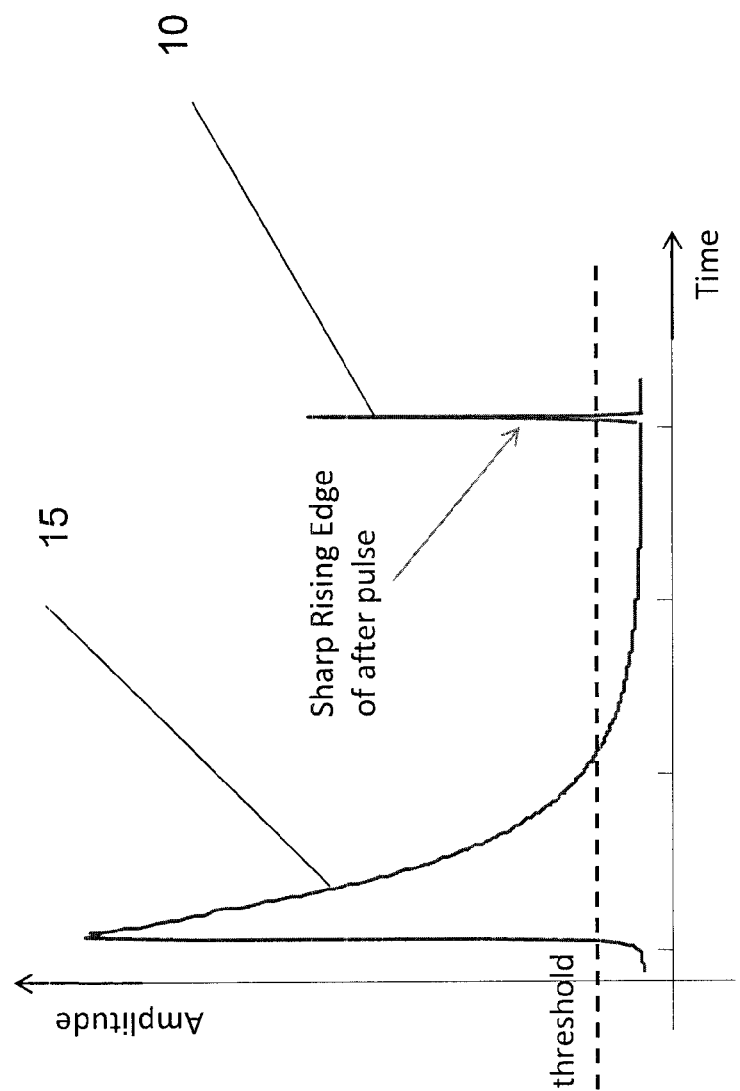
FIG. 1 illustrates an example of an after pulse according to one embodiment.

In one embodiment, there is described a system including a detector including a photosensor that outputs a signal. Also included are a plurality of after-pulse detector devices independently connected to the photosensor via respective electronic pathways. The after-pulse detector devices each detect an after-pulse in the output signal and output an indication when the after-pulse is detected, the after-pulse representing an after-event in the photosensor triggered from a previous photon producing event. Also included in the system is a processing device that receives the indication of the detection of the after-pulse from each of the plurality of after-pulse detector devices, and to determine relative delays between the respective pathways based on relative timing of the received indications. The system also includes a memory that stores each determined relative delay in association with an identification of a corresponding after-pulse detector device.

In another embodiment, the system includes a timing calibrator that calibrates timing for the electronic pathways based on the determined relative delays.

In another embodiment, the after-pulse detector devices each include an integrating filter that filters out signals other than the after-pulse.

In another embodiment, each after-pulse detector device does not detect an after-pulse when the filtered integrated signal is greater than 100 keV.

In another embodiment, the detector includes a plurality of photosensors.

In another embodiment, the plurality of photosensors are assigned to a plurality of trigger zones.

In another embodiment, at least one photosensor is assigned to two zones of the plurality of trigger zones.

In another embodiment, each of the plurality of after-pulse detector devices is associated with a corresponding one of the plurality of trigger zones.

Further, in another embodiment, there is described a timing delay detection method. The method includes the steps of outputting a signal from a detector including a photosensor, detecting an after-pulse in the output signal at a plurality of after-pulse detector devices independently connected to the photosensor via respective electronic pathways, the after-pulse representing an after-event in the photosensor triggered from a previous photon producing event, outputting, at the plurality of after-pulse detector devices, an indication when the after-pulse is detected, receiving, at a processing device, the indication of the detection of the after-pulse from each of the plurality of after-pulse detector devices, determining, at the processing device, relative delays between the respective pathways based on relative timing of the received indications, and storing each determined relative delay in association with an identification of a corresponding after-pulse detector device.

Further, in another embodiment, there is described an after-pulse detector device independently connected to a photosensor via respective electronic pathways. The after-pulse detector device includes an integrator that receives a signal from the photosensor, that performs integration on the received signal, and that outputs an integrated signal. Also included in the after-pulse detector device is a first comparator that receives the signal from the photosensor and that compares the amplitude of the signal with a first reference value, and a second comparator that receives the integrated signal from the integrator and that compares the integrated signal with a second reference value. The after-pulse detector device additionally includes an AND logic gate that receives a first output from the first comparator and a second output from the second comparator and outputs an indication of after-pulse detection in response to both the first output and the second output being logic level high.

Further, in another embodiment, there is described an after-pulse detector device independently connected to a photosensor via respective electronic pathways. The after-pulse detector device including an analog to digital (A/D) converter that receives a signal from the photosensor and that converts the signal into a digital signal. The after-pulse detector further includes an integrating unit that receives the digital signal output from the A/D converter, performs integration on the digital signal, and outputs an integrated signal, a first comparison unit that receives the digital signal from the A/D converter and that compares an amplitude of the signal with a first reference value, and a second comparison unit that receives the integrated signal from the integrating unit and to compare the integrated signal with a second reference value. The after-pulse detector device additionally includes an output unit that outputs an indication of after-pulse detection in response to the first comparison unit determining that the amplitude of the signal is greater than the first reference value and the second comparison unit determining that the integrated signal is less than the second reference value.

Referring now to the drawings wherein like reference numbers designate identical or corresponding parts throughout the several views, FIG. 1 shows an analog output signal from a photosensor, which could be a PMT or a Silicon photo multiplier (SiPM). Information about timing differences between photosensors caused by differences in the electrical pathways can be determined from after-pulses such as after-pulse 10 shown in FIG. 1.

After-pulses are a type of noise that is often observed in PMTs and SiPMs. The after-pulses are an after-event which follows an event. The after-event may be produced by ion feedback for PMTs or hole and electron trapper for SiPMs. The event may include an electron-positron annihilation event or any event which would produce enough photons such that the photons are detected. For example, the beta decay from a Lutetium (Lu) background of a LYSO ($Lu_{1.8}Y_{0.2}SiO_5$ (Ce)) crystal can also trigger an after-pulse from a PMT.

In addition, signals produced by this after-event are spontaneous, occurring without the need to add an external light source. As is shown in FIG. 1, these pulses follow the main signal pulse after a delay period. One mechanism that can cause after-pulses is the emission of light from the latter stages of a PMT that finds its way back into the photosensor. These types of after-pulses follow shortly after the main pulse 15. After-pulses are useful for determining timing at least because these pulses have a sharp rising edge. After-pulses not only have a sharp leading edge, but also have a short duration in time resulting in a small integrated value.

The sharp leading edge and relative high amplitude provide good timing information by way of the after-pulse passing the threshold and generating a trigger signal. The small integrated value also provides a signature that enables the after-pulses to be isolated by filtering out other signals.

Another type of after-pulse is a dark pulse, which may be caused by imperfections in the PMTs. Small amounts of residual gas can be ionized by the passage of electrons through the PMT. The positive ions that are formed move in the reverse direction and some return back to the photo detector. The dark pulses may show up well after the after-pulses because the velocity of the positive ions is relatively low. Although dark pulses are not typically used to determine timing because of the small amplitude of these pulses, it is possible to also use dark pulses to determine timing.

Figure 2:
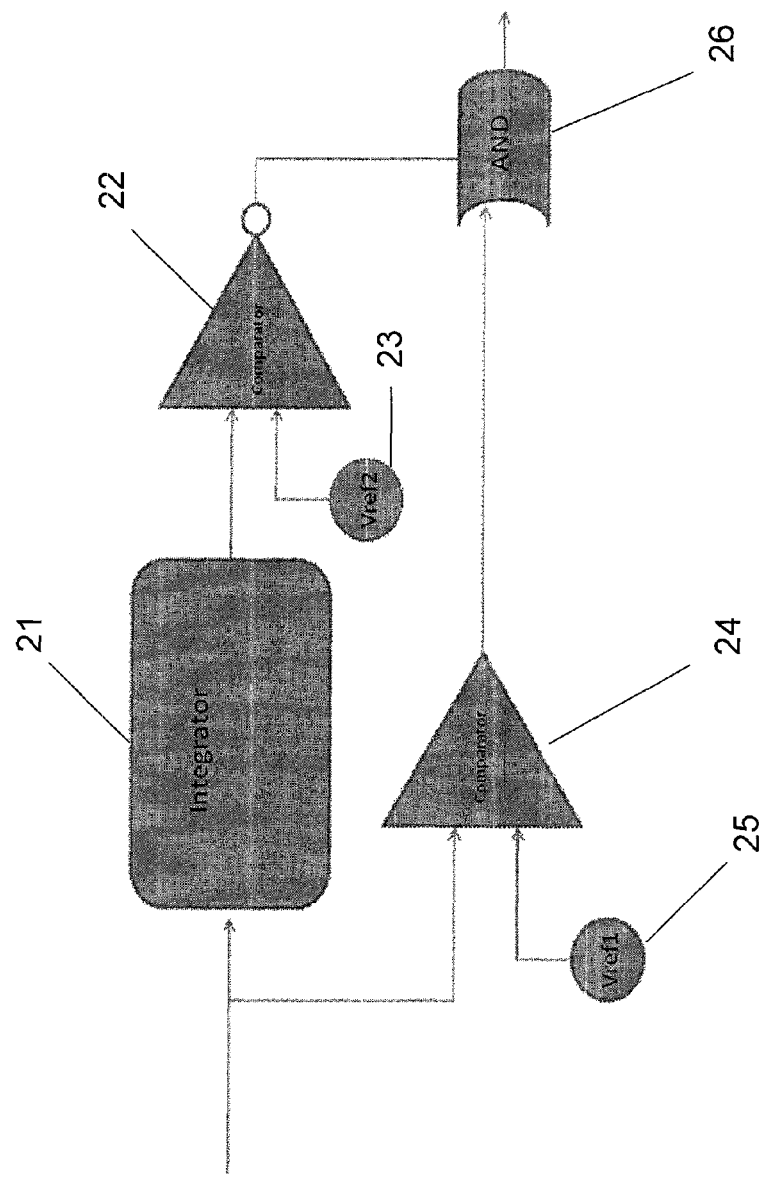
FIG. 2 illustrates an exemplary after-pulse detector circuit.

FIG. 2 illustrates an example of an after-pulse detector. This detector is used to detect the presence of an after-pulse and to output an indication that the after-pulse has been detected.

In an alternate embodiment, the after-pulse detector can be triggered by the detection of an electron-positron annihilation event by a different event detector that is designed to detect the event that precedes the after-pulse. As a result of such a trigger, the after-pulse detector can avoid processing the signals resulting from the main event. The after-pulse detector is turned off after the after-pulse has been detected.

In an additional alternate embodiment, the after-pulse detector is implemented by a combination of software and hardware. In particular, the after-pulse detector obtains the analog signal by way of an analog-to-digital (A/D) converter that samples the signal output from the photosensor. The sampled digital signal is then processed using integration and filtering to determine whether an after-pulse is present in the signal. The digital implementation of the after-pulse detector also keeps track of the timing of each signal so that signals can be compared for timing differences.

The after-pulse detector device shown in FIG. 2 includes an integrator 21 that receives the input signal and produces a time domain integration value. The after-pulse signals have a small time domain integration value compared to the main signal generated from the main event utilizing ionization radiation. Thus, the output from the integrator 21 is input into a comparator 22, which filters out the events that have an integration value that is greater than or equal to a value Vref2 23. For example, Vref2 23 could be set to be a value higher than an integrated signal equivalent of 100 keV (a predetermined threshold associated with an after-pulse). It should be noted that the value of Vref2 23 may be calibrated to better match the particular photosensor from which an after-pulse is being detected.

In addition to filtering out signals which have an integration footprint greater than an after-pulse, the detector also filters out all signals that have an amplitude that is not above a certain threshold. For example, the comparator 24 is set to compare the input signal with Vref1 25, which is set to be above the noise floor but lower than the average amplitude of the after-pulses.

The output of the comparators 22 and 24 are input to AND gate 26. If both signals are high, a signal is output indicating that an after-pulse has been detected.

Figure 3:
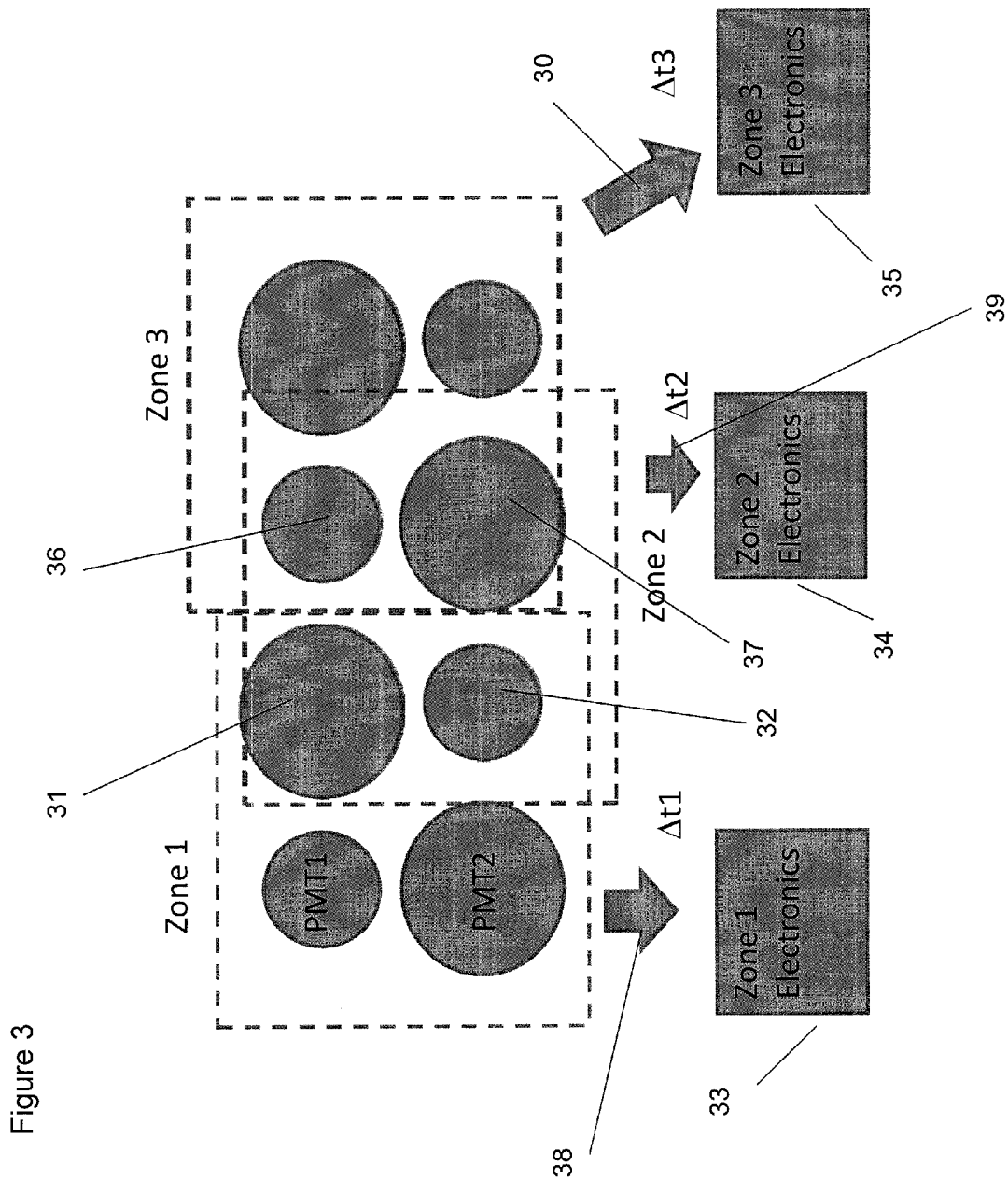
FIG. 3 illustrates a system configuration in which multiple zones are designated for the photosensor array.

FIG. 3 shows an exemplary structure of the PET imaging system having multiple photosensors separated into different zones 1, 2 and 3. Each zone includes photosensors that are also included in another zone. For example, FIG. 3 illustrates that zone 1 includes photosensors 31 and 32, which are also included in zone 2. The photosensors in zone 1 (including photosensors 31 and 32) are connected to zone 1 electronics 33. The photosensors in zone 2 (including photosensors 31 and 32) are connected to zone 2 electronics 34. Thus, although the same event will be detected by photosensors 31 and 32, this event could be recorded at different times by zone electronics 33 and zone electronics 34 due to differences in the electronic pathways (38 and 39) illustrated between photosensors 31 and 32 and zone electronics 33 and 34, respectively. The electronic pathways can alternatively include optical elements.

Similar structure is provided for photosensors 36 and 37, which are located in zone 2 and zone 3. Photosensors 36 and 37 are connected to zone electronics 34 and zone electronics 35 via electronic pathways 39 and 30, respectively.

Each zone electronics 33, 34, and 35 includes an independent after-pulse detector such as the one shown in FIG. 2.

Figure 4:
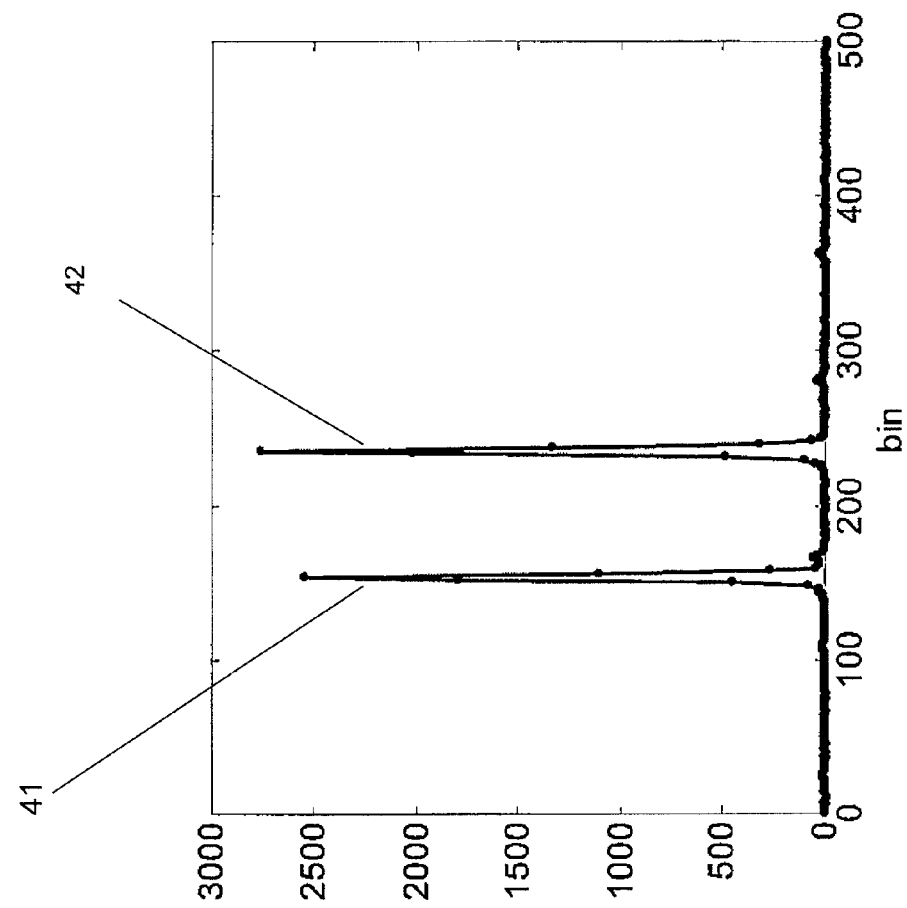
FIG. 4 illustrates an exemplary timing spectrum of after-pulses from a zone.

FIG. 4 illustrates a comparison between signals received by different zone electronics. For instance, FIG. 4 illustrates the differences between the detection of the same after-pulse by zone electronics 33 and 34. For instance, a single after-pulse could be originated from photosensors 31 and/or 32, and the corresponding signal would then send down separate electronic pathways to zone electronics 33 and 34. Zone electronics 33 may receive signal 41 approximately 150 ns after the event, while zone electronics 34 receives signal 42 approximately 225 ns after the event. Thus, the timing difference $\Delta t$ between the electronic pathways is 75 ns.

The zone electronics 33 and 34 may be connected to a single photosensor (e.g. 31 or 32) that is on the zone boundary, that is situated in two zones and that is connected to two sets of zone electronics. As a result, at least some, if not all, of the remaining photosensors in the two zones may not be connected to more than one zone electronics.

Alternatively, multiple photosensors 31 and 32 may each be connected to more than one zone electronics (e.g. 33 and 34). In this case, the signals from the photosensors are summed, delayed, or filtered to ensure that the same signal representing the same after-pulse event is compared at the two zone electronics.

The same after-pulse signals can utilize multiple signal pathways in electronics and be recorded multiple times at different time points. As is illustrated above, the timing differences can be measured by the timing spectrum.

For example, in PET system design, photosensors may be shared between adjacent trigger zones. The same signal from one after-pulse can trigger neighboring trigger zones (e.g. zone 1 and zone 2, etc) and thus be recorded twice. The time difference between these two recorded signals is a measurement of relative timing offset between two trigger zones. Because of the small time domain integration value, the spread (full-with-half-maximum) of the time difference measurement is also very small, as shown in FIG. 4. This direct method provides accurate relative timing offset with fast computation.

Although this embodiment is not used to arrive at an absolute value of timing offset from optics, it is nevertheless a very fast and efficient way to estimate relative timing offset for electronics. These time differences, due to differences in electronic paths, are usually an order of magnitude higher than the actual time differences due to optics. Using the relative timing offset as the initial setting before running accurate timing test/calibration, significantly accelerates the calibration process and improves the calibration accuracy.

Figure 5:
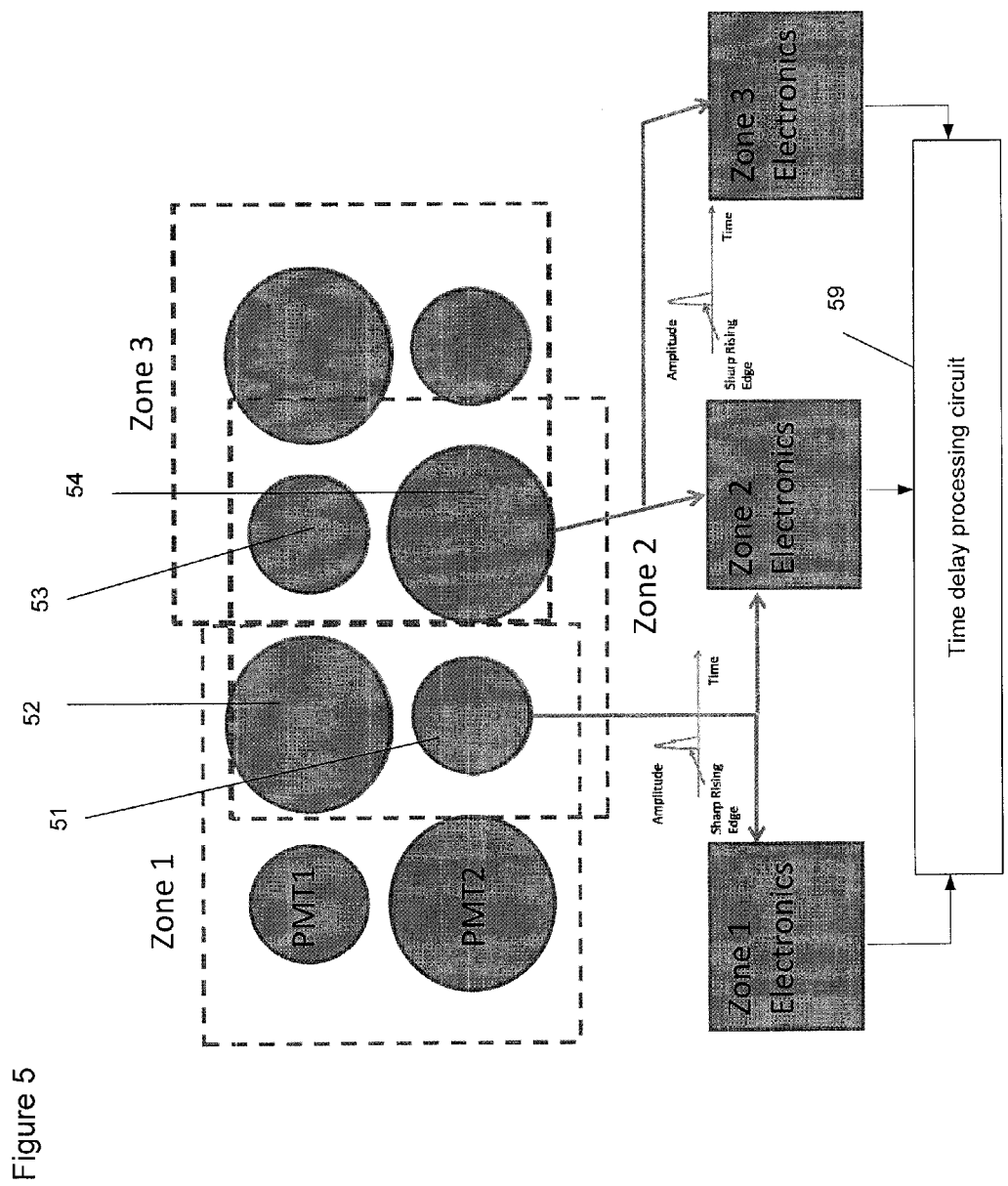
FIG. 5 illustrates another view of the system configuration in which multiple zones are designated for the photosensor array.

FIG. 5 illustrates another example of the PET system according to one embodiment. In this example, photosensor signals are sent to multiple zone electronics, and thus any relative time difference can be estimated by analyzing the time differences between adjacent zones triggered by the after-pulse. For example, zone 1 and zone 2 both include photosensors 51 and 52 and zone 2 and zone 3 both include photosensors 53 and 54. When zone electronics 1 or zone electronics 2 detect the sharp rising edge of the after-pulse, an indication signal is output. The timing differences between the outputs from zone electronics 1 and zone electronics 2 can be used to determine the relative time delay between photosensors 51 and 52 and zone 1 and zone 2 electronics. The processing circuit 59 that determines the relative delay between the electronic pathways is shown in FIG. 5. This processing circuit receives the indications from the various zone electronics 1, 2, and 3 and utilizes this information to determine the time delay difference. For example, the processing circuit 59 may receive the signals from the zone electronics that indicate that an after-pulse has been detected. Using these signals, the processing circuit 59 determines the time difference between receptions of the signals. Using this information, the relative difference can be determined and recorded. In an alternative embodiment, the processing circuit 59 is designed such that each of the zone electronics 1, 2, and 3 is connected to the time delay processing circuit 59 so that there is no delay difference between the respective pathways.

Figure 6:
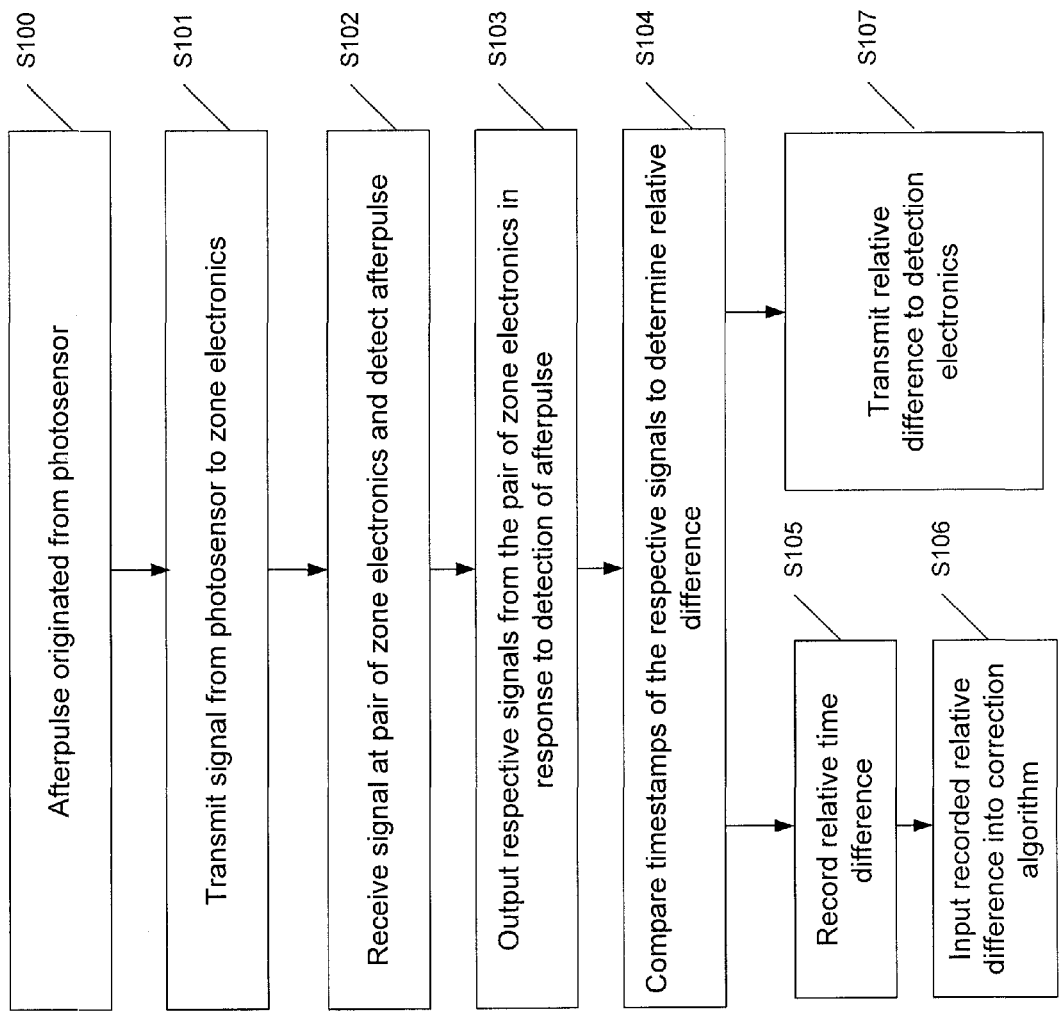
FIG. 6 illustrates a process flow of the system according to one embodiment.

FIG. 6 illustrates a flow diagram of the process of detecting after-pulses and comparing the timings of the after-pulses detected by different zone electronics.

In step S100, an after-pulse is originated by photosensors that are on a zone boundary and are connected to two sets of zone electronics. A photosensor is associated with a zone when the photosensor is connected to the particular electronics associated with the zone. The after-pulse is originated after the main event is originated.

In step S101, a signal is transmitted from photosensors to each zone electronics connected thereto. The photosensors continuously transmit signals to the zone electronics. The after-pulse signal is originated from photosensor after it detects a large enough amount of photons, which is usually from luminescence produced by interaction between radiation and scintillator.

In step S102, each respective signal is received by each of the zone electronics and each signal is analyzed to determine whether an after-pulse is detected.

In step S103, in response to an after-pulse being detected, a signal is output for each zone electronics that detects the after-pulse.

In step S104, the respective time stamp of the output signal from each of the two zone electronics that are connected to the same group of photosensors are compared for the particular after-pulse that is detected by the group of photosensors.

In step S105, the relative difference between the two outputs is recorded.

In step S106, the recorded relative difference is input into a correction algorithm that is used to correct time differences.

In step S107, the relative difference between the two outputs is transmitted to detection electronics, which adjust the system timing offset calibration used for detecting an event.

Certain portions of the processing can be implemented using some form of computer processor. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 7:
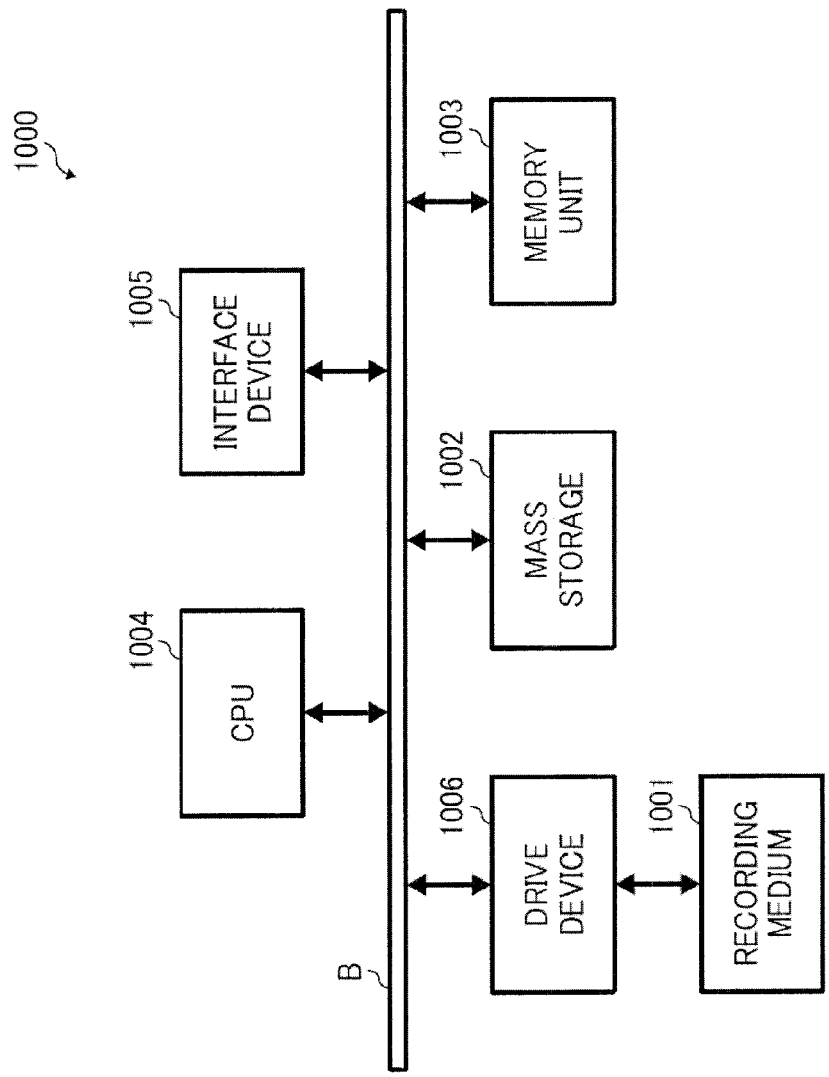
FIG. 7 illustrates an exemplary computer system according to one embodiment.

In addition, certain features of the embodiments can be implemented using a computer based system 1000 shown in FIG. 7. The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the embodiments and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present embodiments includes software for controlling the main processing unit 1004, for driving a device or devices for implementing the embodiments, and for enabling the main processing unit 1004 to interact with a human user. Such software may include, but is not limited to, device drivers, operating systems, development tools, and applications software. Such computer readable media further includes the computer program product of the present embodiments for performing all or a portion (if processing is distributed) of the processing performed in implementing the embodiments.

The computer code elements on the medium of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to a mobile device such as a personal digital assistant (PDA) laptop computer, or cellular telephone.

While certain embodiments have been described, these embodiments have been presented by way of example only, and are not intended to limit the scope of the embodiments. Indeed the novel methods and systems described herein may be embodied in a variety of other forms; furthermore, various omissions, substitutions, and changes in the form of the methods and systems described herein may be made without departing from the spirit of the embodiments. The accompanying claims and their equivalents are intended to cover such forms or modifications as would fall within the scope and spirit of the embodiments.

The invention claimed is:

1. A timing delay detection system, comprising:
   a detector including a photosensor configured to output a signal;
   a plurality of after-pulse detector devices independently connected to the photosensor via respective electronic pathways, the after-pulse detector devices each configured to detect an after-pulse in the output signal and output an indication when the after-pulse is detected, the after-pulse representing an after-event in the photosensor triggered from a previous photon producing event;
   a processing device configured to receive the indication of the detection of the after-pulse from each of the plurality of after-pulse detector devices, and to determine relative delays between the respective pathways based on relative timing of the received indications; and
   a memory configured to store each determined relative delay in association with an identification of a corresponding after-pulse detector device.

2. The timing delay detection system according to claim 1, further comprising:
   a timing calibrator configured to calibrate timing for the electronic pathways based on the determined relative delays.

3. The timing delay detection system according to claim 1, wherein the after-pulse detector devices each include an integrating filter configured to filter out signals other than the after-pulse.

4. The timing delay detection system according to claim 3, wherein each after-pulse detector device is configured to not; detect an after-pulse when the filtered integrated signal is greater than 100 keV.

5. The timing delay detection system according to claim 1, wherein the detector includes a plurality of photosensors.

6. The timing delay detection system according to claim 5, wherein the plurality of photosensors are assigned to a plurality of trigger zones.

7. The timing delay detection system according to claim 6, wherein at least one of the photosensors is assigned to two zones of the plurality of trigger zones.

8. The timing delay detection system according to claim 6, wherein each of the plurality of after-pulse detector devices is associated with a corresponding one of the plurality of trigger zones.

9. A timing delay detection method, comprising:
   outputting a signal from a detector that includes a photosensor;
   detecting an after-pulse in the output signal at a plurality of after-pulse detector devices independently connected to the photosensor via respective electronic pathways, the after-pulse representing an after-event in the photosensor triggered from a previous photon producing event;
   outputting, at the plurality of after-pulse detector devices, an indication when the after-pulse is detected;
   receiving, at a processing device, the indication of the detection of the after-pulse from each of the plurality of after-pulse detector devices;
   determining, at the processing device, relative delays between the respective pathways based on relative timing of the received indications; and
   storing each determined relative delay in association with an identification of a corresponding after-pulse detector device.

10. The timing delay detection method according to claim 9, further comprising:
    performing a timing calibration process based on the determined relative delays.

11. The timing delay detection method according to claim 9, further comprising filtering out signals other than the after-pulse with an integrating filter.

12. The timing delay detection method according to claim 11, wherein the detecting step further comprises not detecting an after-pulse when the filtered integrated signal is greater than 100 keV.

13. The timing delay detection method according to claim 9, wherein the outputting further comprises outputting the signal from the detector that includes a plurality of photosensors.

14. The timing delay detection method according to claim 13, wherein the outputting further comprises outputting the signal from the detector that includes the plurality of photosensors assigned to a plurality of trigger zones.

15. The timing delay detection method according to claim 14, wherein the outputting further comprises outputting the signal from the detector that includes at least one photosensor assigned to two zones of the plurality of trigger zones.

16. The timing delay detection method according to claim 14, wherein the detecting further comprises detecting the after-pulse in the output signal at the plurality of after-pulse detector devices each associated with a corresponding one of the plurality of trigger zones.

* * * * *